United States Patent
Kamimura (10) Patent No.: US 8,570,510 B2
(45) Date of Patent: Oct. 29, 2013

(54) OPTICAL UNIT

(75) Inventor: Ippei Kamimura, Tokyo (JP)

(73) Assignee: NEC System Technologies, Ltd., Osaka (JP)

( * ) Notice: Subject to any disclaimer, the term of this patent is extended or adjusted under 35 U.S.C. 154(b) by 0 days.

(21) Appl. No.: 13/390,650

(22) PCT Filed: Jul. 28, 2010

(86) PCT No.: PCT/JP2010/062688
§ 371 (c)(1),
(2), (4) Date: Feb. 15, 2012

(87) PCT Pub. No.: WO2011/024590
PCT Pub. Date: Mar. 3, 2011

(65) Prior Publication Data
US 2012/0147373 A1    Jun. 14, 2012

(30) Foreign Application Priority Data
Aug. 25, 2009    (JP) .................................. 2009-194369

(51) Int. Cl.
*G01J 3/28*    (2006.01)

(52) U.S. Cl.
USPC ........................................................ 356/328

(58) Field of Classification Search
USPC .................. 356/328, 326, 331, 334, 216, 217
See application file for complete search history.

(56) References Cited

U.S. PATENT DOCUMENTS

2007/0089496 A1* 4/2007 Degertekin .................... 73/104
2007/0115553 A1   5/2007 Chang-Hasnain et al.

FOREIGN PATENT DOCUMENTS

| JP | 5-249032 A | 9/1993 |
|---|---|---|
| JP | 2002-196123 A | 7/2002 |
| JP | 2002-296116 A | 10/2002 |
| JP | 2006-12826 A | 1/2006 |
| WO | WO 2007/118895 A1 | 10/2007 |

OTHER PUBLICATIONS

"Bunkogakuteki Seishitsu o Shu to Shita Kiso Bussei Zuhyo", 1st Edition, Kyoritsu Shuppan Co., Ltd. NBN: JP-69005569, May 15, 1972, pp. 202, 471, and 500.

* cited by examiner

*Primary Examiner* — Tarifur Chowdhury
*Assistant Examiner* — Abdullahi Nur
(74) *Attorney, Agent, or Firm* — Sughrue Mion, PLLC (57) ABSTRACT

An optical unit has a filter member that disperses transmitted light and a photodetector that has light receiving elements. The filter member has a light transmissive substrate, protrusions including a first metallic material and formed on one surface of the substrate, and a metal film including a second metallic material having a refractive index higher than that of the first metallic material and formed so as to cover the protrusions as well as the one surface of the substrate. The metal film located between adjacent protrusions can be a diffraction grating and the protrusions can be waveguides. At least one of the grating cycle of the diffraction grating, the height of the protrusions, and the thickness of the metal film is set to a value different for each portion such that a wavelength of light transmitted through the filter member changes for each portion.

5 Claims, 6 Drawing Sheets

OPTICAL UNIT

CROSS REFERENCE TO RELATED APPLICATIONS

This application is a National Stage of International Application No. PCT/JP2010/062688 filed on Jul. 28, 2010, which claims priority from Japanese Patent Application No. 2009-194369, filed on Aug. 25, 2009, the contents of all of which are incorporated herein by reference in their entirety.

TECHNICAL FIELD

The present invention relates to an optical unit for performing spectral analysis on transmitted light or reflected light from an object.

BACKGROUND ART

In recent years, spectrophotometers have been actively used in a variety of fields. A spectrophotometer is a device that irradiates an object to be measured with light of different wavelengths, and measures the spectral distribution (spectral density) of the object being measured.

Generally, a spectrophotometer is provided with an optical unit and a control unit. The optical unit is mainly constituted by a spectrograph and a photodetector. The spectrophotometer may also be provided with an optical unit for use as a light source in addition to an optical unit for receiving light.

In the optical unit, the spectrograph separates transmitted light or reflected light from an object into light of specific wavelengths. The photodetector detects the separated light, and outputs a signal according to the amount of detected light. At this time, output is performed for each wavelength of detected light. In the control unit, the luminance of the detected light is then computed for each output signal. A spectral distribution is acquired as a result.

Incidentally, the use of a prism as the spectrograph constituting the optical unit is heretofore known. When a prism is employed as the spectrograph, however, the size of the optical unit and, by extension, the size of the spectrophotometer tends to increase, making it difficult to reduce the cost of spectrophotometers. In order to solve such problems, a spectrophotometer in which bandpass filters that only allow light of specific wavelengths to pass are used as the spectrograph has been proposed (see Patent Literature 1).

Patent Literature 1 discloses an optical unit that is provided with three sheet-like bandpass filters having different transmission wavelengths, and three light receiving elements corresponding to the bandpass filters. With this optical unit, the band bandpass filters are sheet-like in form, and are disposed such that their main surfaces coincide. The light receiving elements are each disposed so as to receive light transmitted through the corresponding bandpass filter. Therefore, the corresponding light receiving element outputs a signal according to the wavelength of received light.

With the optical unit disclosed in Patent Literature 1, the three sheet-like bandpass filters thus function as a spectrograph. Accordingly, use of the optical unit disclosed in Patent Literature 1 enables three types of light having different wavelengths to be measured with a simple configuration. A similar optical unit to the optical unit disclosed in Patent Literature 1 is also disclosed in Patent Literature 2.

CITATION LIST

Patent Literature

Patent Literature 1: JP 05-249032A
Patent Literature 2: JP 2002-296116A

SUMMARY OF THE INVENTION

Problem to be Solved by the Invention

Incidentally, while a typical bandpass filter is created by forming a metal film or an oxide film on a glass substrate, narrowing the transmission wavelength band with such a bandpass filter is problematic. Thus, with the optical units disclosed in Patent Literatures 1 and 2, there is a problem in that the accuracy of spectral analysis cannot be improved given the difficulty of increasing the types of wavelengths that are measured.

Also, with the optical units disclosed in Patent Literatures 1 and 2, the plurality of bandpass filters are created separately, and subsequently need to be connected. Thus, even in the case where the optical units disclosed in Patent Literatures 1 and 2 are used, the effect of reducing the cost of spectrophotometers is thought to be minimal given the difficulty of reducing the manufacturing cost of the spectrograph.

An exemplary object of the present invention is to solve the above problems by providing an optical unit that is capable of detecting numerous types of light having different wavelengths at a low cost.

Means for Solving the Problem

In order to attain the above object, the optical unit in one aspect of the present invention is provided with a filter member that separates transmitted light and a photodetector having a plurality of light receiving elements, the filter member being provided with a light transmissive substrate, a plurality of protrusions formed with a first metallic material on one surface of the substrate, and a metal film formed by a second metallic material having a higher refractive index than the first metallic material so as to cover the one surface of the substrate along with the plurality of protrusions, the plurality of protrusions being disposed such that the metal film located between adjacent protrusions serves as a diffraction grating and the protrusions serve as a waveguide, at least one of a grating pitch of the diffraction grating, a height of the protrusions and a thickness of the metal film is set, such that a wavelength of light transmitted through the filter member changes for each portion, to a different value for each of the portions, and the photodetector being disposed such that each of the plurality of light-receiving elements receives light transmitted through the filter member.

Effects of the Invention

The above features enable an optical unit of the present invention to detect numerous types of light having different wavelengths at a low cost.

BRIEF DESCRIPTION OF DRAWINGS

FIG. 5 shows diagrams indicating the relation between portions of the filter member shown in FIG. 1 and frequencies of transmitted light.

DESCRIPTION OF THE INVENTION

Embodiment

Hereinafter, an optical unit in an embodiment of the present invention is described, with reference to FIG. 1 to FIG. 6. Initially, a configuration of the optical unit in the present embodiment is described using FIG. 1 to FIG. 3.

Figure 1:
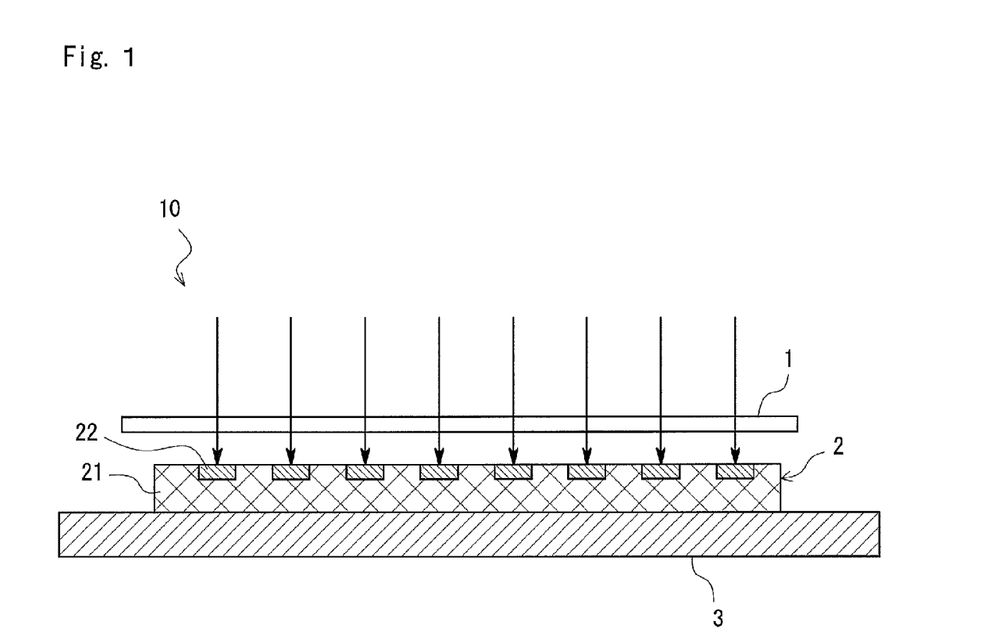
FIG. 1 is a cross-sectional view showing a schematic configuration of an optical unit in an embodiment of the present invention.
Figure 2:
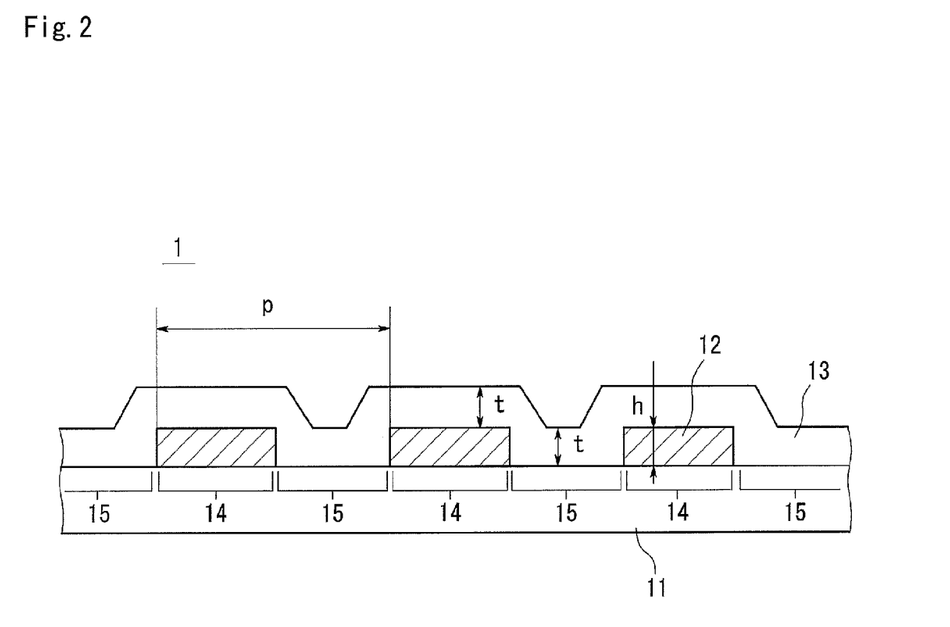
FIG. 2 is an enlarged cross-sectional view showing a configuration of a filter member shown in FIG. 1.
Figure 3:
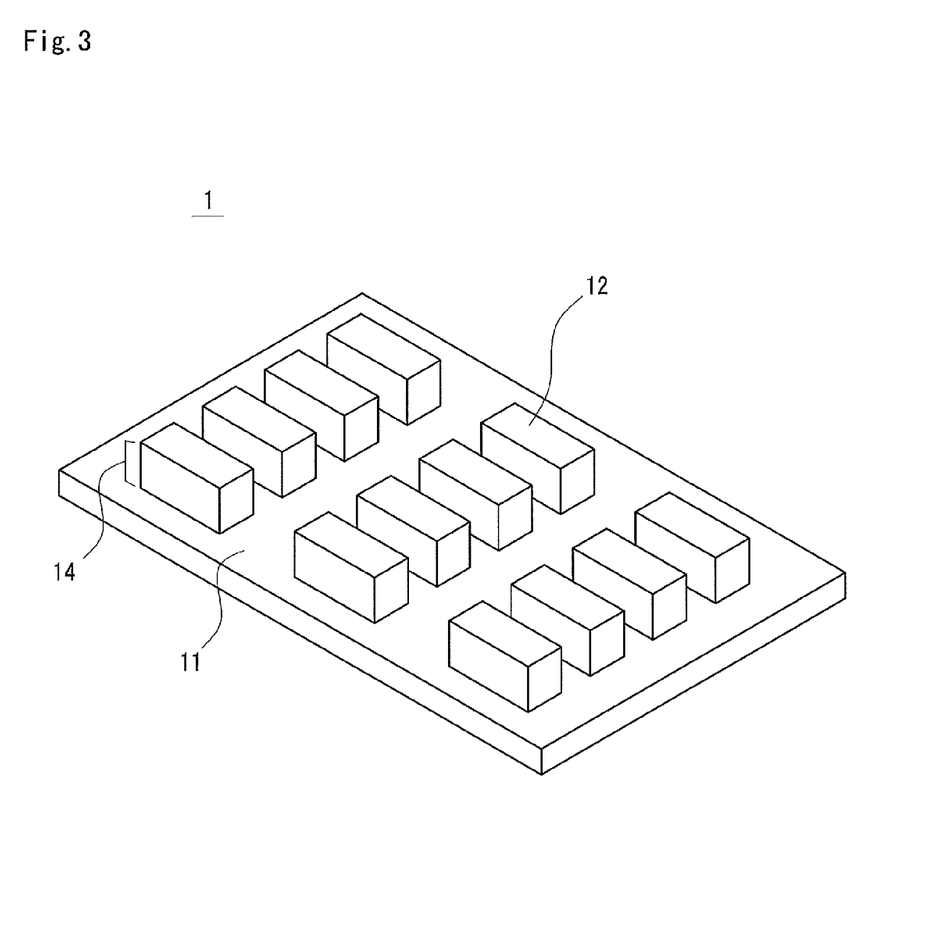
FIG. 3 is a perspective view for illustrating the configuration of the filter member shown in FIG. 1.

FIG. 1 is a cross-sectional view showing a schematic configuration of the optical unit in the embodiment of the present invention. FIG. 2 is an enlarged cross-sectional view showing a configuration of a filter member shown in FIG. 1. FIG. 3 is a perspective view for illustrating the configuration of the filter member shown in FIG. 1. Note that in FIG. 2 only the cross-sections of the protrusions are hatched.

As shown in FIG. 1, an optical unit 10 in the present embodiment is provided with a filter member 1 for separating transmitted light and a photodetector 2 having a plurality of light receiving elements 22. In FIG. 1, reference numeral 3 denotes a substrate serving as a frame of the optical unit 10. While the filter member 1 is fixed to the substrate 3 by a jig, the jig is not depicted in FIG. 1.

As shown in FIG. 2, the filter member 1 is provided with a light transmissive substrate 11, a plurality of protrusions 12 formed on one surface of the substrate 11, and a metal film 13 that covers the one surface of the substrate 12 along with the plurality of protrusions 12.

Each protrusion 12 is formed by a first metallic material, and the metal film 13 is formed by a second metallic material having a higher refractive index than the first metallic material. Further, as shown in FIG. 2 and FIG. 3, the plurality of protrusions 12 are disposed such that the metal film 13 located between adjacent protrusions 12 serves as a diffraction grating 15 and each protrusion 12 serves as a waveguide 14.

In the filter member 1, at least one of a grating pitch p of the diffraction grating 15, a height h of the protrusions 12 and a thickness t of the metal film 13 is set, such that the wavelength of light transmitted through the filter member 1 changes for each portion, to a different value for each of the portions. In other words, the filter member 1 is formed such that the wavelength of transmitted light differs for each of the portions thereof. Note that as shown in FIG. 2, the grating pitch p of the diffraction grating 15 is, substantively, the distance between adjacent protrusions 12 from the side face on one side of one protrusion 12 to the side face on the same side of the other protrusion 12.

Figure 4:
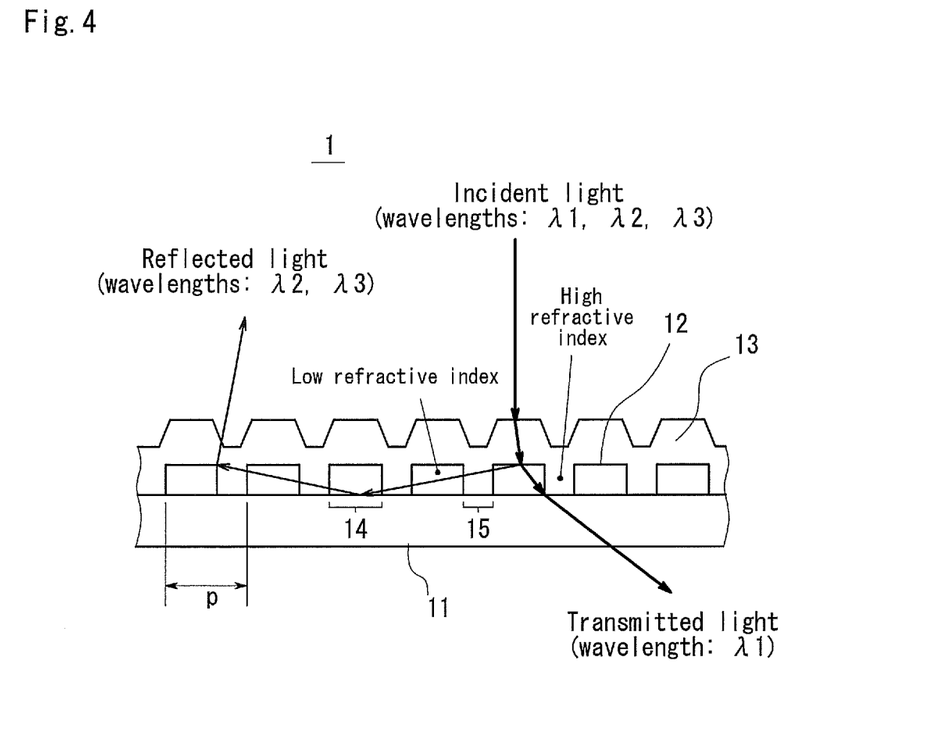
FIG. 4 is a cross-sectional view for illustrating a function of the filter member shown in FIG. 1.

Here, the function of the filter member 1 used in the present embodiment is further specifically described using FIG. 4 in addition to FIG. 1 to FIG. 3. FIG. 4 is a cross-sectional view for illustrating the function of the filter member shown in FIG. 1. Note that in FIG. 4 the hatching is omitted for illustrative purposes.

As mentioned above, the metal film 13 located between the protrusions 12 forms the diffraction grating 15 (see FIG. 4). At this time, in order to make the metal film 13 function as a diffraction grating, the grating pitch p of the diffraction grating is set, for each of the portions that transmit light of different wavelengths, so as to be shorter than the wavelength of light that is required to be transmitted through the portion. Also, in terms of the performance of the diffraction grating 15, the plurality of protrusions 12 preferably are each formed as a rectangular column, and, further, as shown in FIG. 3, are disposed in a matrix.

The protrusions 12 serve as sub-wavelength gratings and thus function as waveguides 14, and, as shown in FIG. 4, incident light L1 that is incident on the filter member 1 propagates inside the protrusions 12 as an evanescent wave. However, only light of a set frequency, among the types of light included in the incident light L1, reaches the substrate 11 and is transmitted through the substrate 11. The light of other frequencies is reflected by the substrate 11. In the example of FIG. 4, the incident light L1 is mixed light that includes the light of a wavelength λ1, the light of a wavelength λ2 and the light of a wavelength λ3, among which only the light of wavelength λ1 is transmitted through the filter member 1.

With the filter member 1 shown in FIG. 2 to FIG. 4, the wavelength of transmitted light can be selected by appropriately setting the shape of the diffraction grating 15, the refractive index of each member constituting the filter member 1, and the extinction coefficient of the protrusions 12. Of these, the shape of the diffraction grating 15 can be set by the grating pitch p of the diffraction grating 15, the height h of the protrusions 12, and the thickness t of the metal film 13. The value of the extinction coefficient of the protrusions 12 is dependent on the height h of the protrusions 12.

Accordingly, changing any of the grating pitch p of the diffraction grating 15, the height h of the protrusions 12, the thickness t of the metal film 13 and the refractive index of the members, for each portion, enables a filter member 1 in which the wavelength of transmitted light differs for each portion to be obtained. Specifically, if the height h of the protrusions 12 is increased, the wavelength of transmitted light tends to lengthen. Similarly, the wavelength of transmitted light also tends to lengthen in the case where the grating pitch p of the diffraction grating 15 is widened or where the refractive index of the substrate 11 is increased.

Since it is, however, actually difficult to change the refractive index of each member on a portion-by-portion basis, in the present embodiment the wavelength of transmitted light of each portion is set by the grating pitch p of the diffraction grating 15, the height h of the protrusions 12, and the thickness t of the metal film 13. Further, the transmitted light actually has a narrowband wavelength, and the wavelength of transmitted light is set for the center wavelength of narrowband light.

Also, the materials used for the substrate 11, the protrusions 12 and the metal film 13 can be appropriately set so as to facilitate transmission of light of the target wavelength. For example, in the case where light is transmitted light in an infrared range, examples of the material used for the substrate 11 include silicon oxide ($SiO_2$). In this case, the substrate 11 is so-called quartz substrate. Also, examples of a first metallic material used for the protrusions 12 include gold (Au) or an alloy containing gold (Au). Further, examples of the material used for the metal film 13 include titanium oxide ($Tio_2$).

Here, an example in which the center wavelength of transmitted light is, for example, set to 1.48 μm in the case of light being transmitted light in an infrared range is described. The refractive index of the titanium oxide forming the metal film 13 is "1.904", the refractive index of the silicon oxide forming the substrate 11 is "1.465", and the reflectance of gold is "0.944". Also, it is assumed that the height h of the protrusions 12 is set to "62 μm". Although the refractive index and extinction coefficient of gold can take innumerable values, in the above example the refractive index and extinction coefficient of gold are assumed to respectively be "0.50" and "7.1". In such an example, the grating pitch p of the diffraction grating 15 can be set to "1064.7 μm" and the thickness t of the metal film 13 can be set to "134 μm."

Figure 5A:
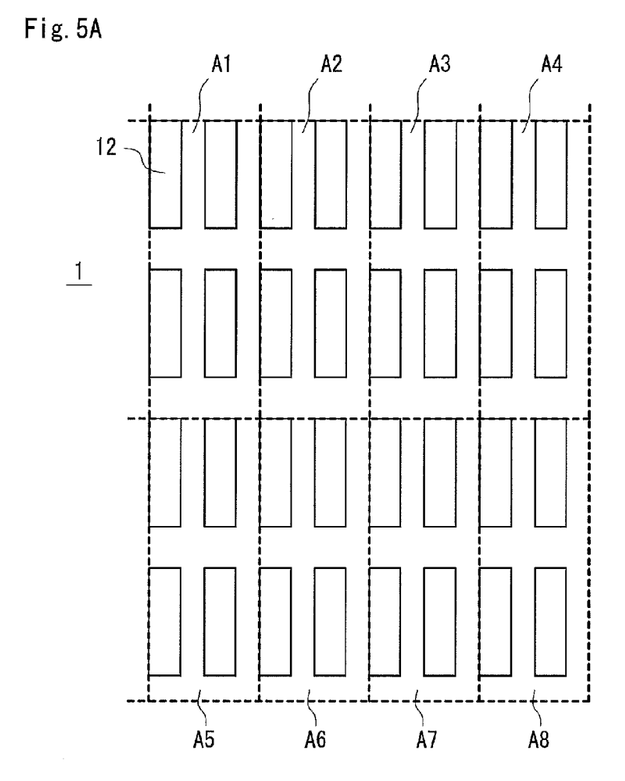
FIG. 5A is a diagram showing the portions of the filter member shown in FIG. 1.
Figure 5B:
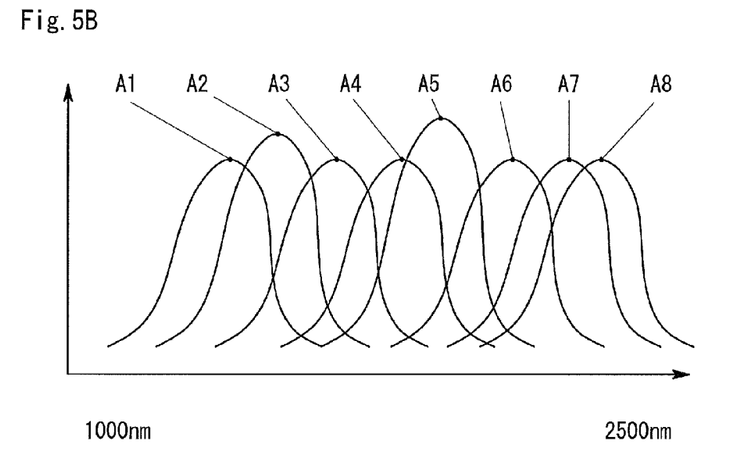
FIG. 5B is a diagram showing an example of mixed light that is incident on the filter member.

With such a configuration, when mixed light is incident on the filter member 1, the plurality of types of light included in the mixed light are separated by each portion of the filter member 1, due to the above-mentioned function. This point is described using FIG. 5. FIG. 5 shows diagrams indicating the relation between portions of the filter member shown in FIG. 1 and frequencies of transmitted light. FIG. 5A is a diagram showing the portions of the filter member shown in FIG. 1, and FIG. 5B is a diagram showing an example of mixed light that is incident on the filter member.

As shown in FIG. 5A, the filter member 1 is provided with eight portions A1 to A8 that transmit light of different wavelengths. Thus, when the mixed light shown in FIG. 5B is incident on the filter member 1 as incident light, the light of each type of light will only be transmitted through the portion capable of transmitting light of that wavelength and will be reflected by the other portions. For example, the light with the shortest wavelength in FIG. 5B is transmitted through the portion A1.

Also, in the case where quartz substrate is used as the substrate 11, the protrusions 12 are formed of gold and the metal film 13 is formed of titanium oxide, the filter member can be produced by the following manufacturing processes.

First, preprocessing for enhancing adhesion with a gold film formed in the next process is executed on the quartz substrate that will serve as the substrate 11. Next, a gold film is formed by sputtering or the like on one surface of the quartz substrate.

Next, a resist pattern is formed on the gold film in order to form the film into the protrusions 12. Specifically, an electron beam (EB) resist is first coated on the gold film, and the EB resist is subsequently processed into the set shape of the pattern by an electron beam drawing apparatus. The grating pitch p between adjacent protrusions 12 can be set to a different value for each portion by the shape of this resist pattern.

Next, etching is implemented using the resist pattern as a mask, and the state shown in FIG. 3 results when the resist pattern is removed. When reducing the height h of some of the protrusions 12 in the state shown in FIG. 3, etching is performed after creating a mask that covers only the protrusions 12 whose height does not need to be reduced.

Thereafter, the titanium oxide metal film 13 that will cover one surface of the substrate 11 including the protrusions 12 is formed by vapor deposition. Also, when reducing the thickness t of part of the metal film 13, etching is performed after creating a mask that covers only the portions whose thickness will not be reduced. The filter member 1 is completed by the above processes.

As shown in FIG. 1, the photodetector 2 is disposed such that each of the plurality of light receiving elements 22 receives light transmitted through the filter member 1. Transmitted light is thus received and detected by a different light receiving element 22, for each portion of the filter member 1.

In the present embodiment, the photodetector 2 preferably is a solid-state imaging device having a semiconductor substrate 21 on which the plurality of light receiving elements 22 are formed in a matrix, such as a CCD (charge-coupled device) imaging device or a MOS imaging device, for example. In the case where a solid-state imaging device is used, transmitted light can be reliably detected, since the plurality of light receiving elements 22 can be allocated to one portion of the filter member.

As described above, with the filter member 1 used in the present embodiment, the type of light to be transmitted can be selected using a fine diffraction grating, enabling the transmission wavelength band to be reduced in comparison to the filter members shown in the above Patent Literatures 1 and 2. The optical unit of the present embodiment thus enables numerous types of light having different wavelengths to be detected and the accuracy of spectral analysis to be improved.

Further, with the filter member 1 used in the present embodiment, the portions that transmit light of mutually different wavelengths are integrally produced at the one time, allowing production cost to also be reduced in comparison to the filter members shown in the above Patent Literatures 1 and 2. Reduction in the cost of the optical unit 10 of the present embodiment and, by extension, the cost of spectrophotometers using this optical unit can thus also be attained.

Figure 6:
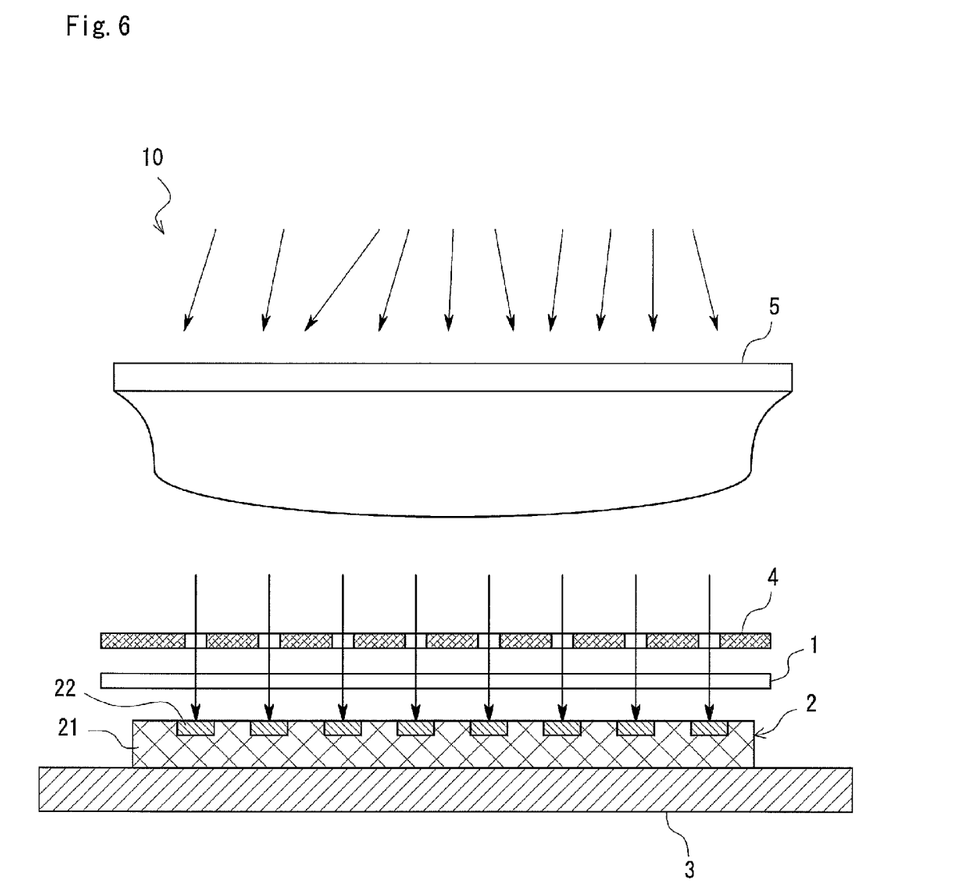
FIG. 6 is a cross-sectional view showing a schematic configuration of another example of the optical unit in the embodiment of the present invention.

In the present embodiment, the optical unit 10 can also further be configured as shown in FIG. 6. FIG. 6 is a cross-sectional view showing a schematic configuration of another example of the optical unit in the embodiment of the present invention. In the example shown in FIG. 6, the optical unit 10 is provided with a slit member 4 and a collimator lens 5.

Therefore, according to the example shown in FIG. 6, in the case where light from an object is diffused light, this diffused light is converted into parallel light by the collimating lens 5. Only parallel light that passes through the slit member 4 is incident on the filter member 1. With the optical unit 10, light from an object can be efficiently caused to be incident on the filter member 1 in the case where the example shown in FIG. 6 is employed, enabling the accuracy of light detection using the optical unit 10 to be enhanced.

Although the invention was described above with reference to an embodiment, the invention is not limited to the above embodiment. Those skilled in the art will appreciate that various modifications can be made to the configurations and details of the invention without departing from the scope of the invention.

This application is based upon and claims the benefit of priority of prior Japanese Patent Application No. 2009-194369, filed on Aug. 25, 2009, the entire contents of which are incorporated herein by reference.

The optical unit of the invention has the following features.

(1) The optical unit is provided with a filter member that separates transmitted light and a photodetector having a plurality of light receiving elements, the filter member being provided with a light transmissive substrate, a plurality of protrusions formed with a first metallic material on one surface of the substrate, and a metal film formed by a second metallic material having a higher refractive index than the first metallic material so as to cover the one surface of the substrate along with the plurality of protrusions, the plurality of protrusions being disposed such that the metal film located between adjacent protrusions serves as a diffraction grating and the protrusions serve as a waveguide, at least one of a grating pitch of the diffraction grating, a height of the protrusions and a thickness of the metal film is set, such that a wavelength of light transmitted through the filter member changes for each portion, to a different value for each of the portions, and the photodetector being disposed such that each of the plurality of light-receiving elements receives light transmitted through the filter member.

(2) In the optical unit according to (1) above, the grating pitch of the diffraction grating is formed, for each of the portions, so as to be shorter than the wavelength of light that is required to be transmitted through the portion.

(3) In the optical unit according to (1) above, a material used for the substrate includes silicon oxide, the first metallic material includes gold (Au), and the second metallic material includes titanium oxide.

(4) In the optical unit according to (1) above, the plurality of protrusions are formed as rectangular columns and disposed in a matrix.

(5) In the optical unit according to (1) above, the photodetector is a solid-state imaging device having a semiconductor substrate on which the plurality of light receiving elements are formed in a matrix.

Industrial Applicability

According to the present invention, as described above, an optical unit that is able to detect numerous types of light having different wavelengths can be provided at a low cost. The present invention is useful in devices that perform spectral analysis on transmitted light or reflected light from an object.

LIST OF REFERENCE NUMERALS

1 Filter member
2 Photodetectors
3 Substrate
4 Slit member
5 Collimator lens
10 Optical unit
11 Substrate
12 Protrusions
13 Metal film
14 Waveguides
15 Diffraction grating
21 Semiconductor substrate
22 Light receiving elements

The invention claimed is:

1. An optical unit comprising:
a filter member that separates transmitted light; and
a photodetector having a plurality of light receiving elements,
wherein the filter member includes:
a light transmissive substrate;
a plurality of protrusions formed with a first metallic material on one surface of the substrate; and
a metal film formed by a second metallic material having a higher refractive index than the first metallic material, so as to cover the one surface of the substrate along with the plurality of protrusions,
the plurality of protrusions are disposed such that the metal film located between adjacent protrusions serves as a diffraction grating and incident light that is incident the filter member from an other side of the photodetector propagates inside the protrusions as an evanescent wave,
at least one of a grating pitch of the diffraction grating, a height of the protrusions and a thickness of the metal film is set, such that a wavelength of light transmitted through the filter member changes for each portion, to a different value for each of the portions, and
the photodetector is disposed such that each of the plurality of light-receiving elements receives light transmitted through the filter member.

2. The optical unit according to claim 1,
wherein the grating pitch of the diffraction grating is formed, for each of the portions, so as to be shorter than the wavelength of light that is required to be transmitted through the portion.

3. The optical unit according to claim 1,
wherein a material used for the substrate includes silicon oxide, the first metallic material includes gold (Au), and the second metallic material includes titanium oxide.

4. The optical unit according to claim 1,
wherein the plurality of protrusions are formed as rectangular columns and disposed in a matrix.

5. The optical unit according to claim 1,
wherein the photodetector is a solid-state imaging device having a semiconductor substrate on which the plurality of light receiving elements are formed in a matrix.

* * * * *